US005580504A

United States Patent [19]

Spann et al.

[11] Patent Number: 5,580,504

[45] Date of Patent: *Dec. 3, 1996

[54] METHOD OF MAKING A MATTRESS OVERLAY

[75] Inventors: Donald C. Spann; Daniel J. Schaefer, both of Greenville, S.C.; Thomas A. Krouskop, Stafford, Tex.

[73] Assignee: Span-America Medical Systems, Inc., Greenville, S.C.

[ * ] Notice: The term of this patent shall not extend beyond the expiration date of Pat. No. 5,252,278.

[21] Appl. No.: 349,078

[22] Filed: Dec. 2, 1994

Related U.S. Application Data

[63] Continuation of Ser. No. 99,605, Jul. 30, 1993, abandoned, which is a continuation of Ser. No. 639,790, Jan. 10, 1991, Pat. No. 5,252,278, which is a division of Ser. No. 372,860, Jun. 19, 1989, Pat. No. 5,025,519, which is a continuation of Ser. No. 235,806, Aug. 23, 1988, Pat. No. 4,862,538, which is a continuation of Ser. No. 921,968, Oct. 22, 1986, abandoned.

[51] Int. Cl.[6] .......................... A47C 27/14; B29C 67/00

[52] U.S. Cl. ................................ 264/138; 83/13; 83/861; 264/321

[58] Field of Search .................................. 264/138, 321; 83/13, 861

[56] References Cited

U.S. PATENT DOCUMENTS

| | | | |
|---|---|---|---|
| 2,638,156 | 5/1953 | Berman | 267/145 |
| 3,828,378 | 8/1974 | Flam | 5/464 |
| 3,885,257 | 5/1975 | Rogers | 5/464 |
| 4,110,881 | 9/1978 | Thompson | 29/91.1 |
| 4,279,044 | 7/1981 | Douglas | 5/453 |
| 4,573,456 | 3/1986 | Spann | 602/27 |

*Primary Examiner*—Leo B. Tentoni

*Attorney, Agent, or Firm*—Dority & Manning, PA

[57] ABSTRACT

A method of making a polyurethane foam mattress overlay so that it has several sections defined in a relatively flat support surface thereof. The sections are longitudinally disposed so as to correspond with different parts of a user's body. Each such section has predetermined support characteristics which are selected in relationship with such characteristics for the other sections so as to define systematized support. Specific numerical ranges and interrelationships for such sections are preferred. A plurality of projections are formed in each surface section. In general, the cross-sectional area of such projections at the overlay support surface or at a given depth therefrom is the same within each section, but differs from one section to another. Separation distances between such projections may also vary with the respective sections. The resulting tailored support characteristics in respective sections provide engineered support for all parts of a user's body. Side edges of the projections may be bevelled and/or include a radius of curvature to enhance independent action of the projections. Channels for dissipating heat and moisture may be provided, and have characteristics which vary with the different support sections. An effectiveness index takes into consideration the thickness, indentation load deflection (i.e., stiffness), and density of a given pad, to assist practioners in selecting appropriate embodiments of the invention.

30 Claims, 3 Drawing Sheets

METHOD OF MAKING A MATTRESS OVERLAY

This is a continuation of application Ser. No. 08/099,605 filed Jul. 30, 1993, now abandoned, which was a continuation of Ser. No. 07/639,790 filed Jan. 10, 1991 now U.S. Pat. No. 5,252,278, which was a div. of Ser. No. 07/372,860, filed Jun. 28, 1989 now U.S. Pat. No. 5,025,519, which is a continuation of U.S. Ser. No. 07/235,806 filed Aug. 23, 1988, now U.S. Pat. No. 4,862,538 and which was a file wrapper continuation of Ser. No. 06/921,968 filed Oct. 22, 1986, now abandoned.

BACKGROUND OF THE INVENTION

This invention concerns mattress pads or overlays in general, and in particular a mattress pad having a variety of features for providing sectioned support areas collectively functioning as a coordinated system for improved pressure dispersion for all parts of a user's body.

Decubitus ulcers, also known as bed sores, are a significant concern for bed-ridden patients. The problem of prolonged pressure on natural bony projections of a patient (such as the scapula, sacrum, and trochanter) is compounded in acute care settings where the patient cannot be frequently turned or moved. It is relatively common practice in hospitals in the United States for a flexible polyurethane foam mattress overlay to be used to supplement the mattresses of acute care patients. The goal generally is to provide at least some relief from bed sores during their immobilization. Simple convoluted foam pads, readily produced with known machinery, are typical of mattress overlays in present use.

A major thrust in recent hospital care practices has included higher-developed cost consciousness. To reduce costs, a trend has developed whereby convoluted foam pads are provided with relative taller conical peaks and thinner bases so that the pad may be produced with less foam (and hence be more cheaply provided). Many of such convoluted foam pads typically provide uniform instead of differentiated support across their entire patient support surface. Accordingly, effective pressure distribution for the prevention of decubitus ulcers is not optimized for all parts of a patient's body.

Other forms of cushions or pads are known. For example, Derman (U.S. Pat. No. 2,638,156) discloses a seat-type cushion having a substantially flat support surface, but utilizing density variations for different segments thereof to variably support the ischial tuberosites of a user's pelvis. Variations in density may be obtained in alternative ways, but particularly include the production of channels and cavities through the cushion (i.e., the removal of material). Rogers (U.S. Pat. No. 3,885,257) also varies support provided with a defined section of a pad by varying the amount of material removed from around projections formed thereby. However, the cross-sectional area of the external support surface of each projection is maintained constant over an entire block of his invention. Furthermore, the generally to substantially reduced cross-sectional area of such projections beneath the upward external support surface thereof can cause such projections to buckle, twist, and/or become unusually compressed, during load bearing, with possible unintended modification of the support action offered thereby.

Thompson (U.S. Pat. No. 4,110,881) discloses a process for fabricating a mattress including the making of slots of varying depth and/or spacing therein so as to alter the support provided thereby. Removal of material is not ordinarily significant nor a design parameter. Instead, slicing is effected to provide a foamed material mattress which mimics the function of "inner spring" mattresses.

In addition to such cutting (i.e. slicing) and coring (i.e. producing cavities) other processing of foam products may be effected. For example, Spann (U.S. Pat. No. 4,573,456) discloses air channels which may be formed in a foam block for dissipating heat and moisture away from a person utilizing a product made from such foam block. And, though not in all circumstances analogous to foam pads, other types of mattress supplements are generally known. For example, Douglas (U.S. Pat. No. 4,279,044) discloses a fluid support system with automatic valving for distributing the body weight of a patient received thereon.

SUMMARY OF THE PRESENT INVENTION

It is one object of this invention to provide an improved mattress overlay or pad with coordinated support characteristics which optimize support for all parts of a patient's body. Support provided by various sections of the mattress overlay is preferably selected in accordance with the support provided by the other sections. It is therefore another object of the present invention to establish a relationship among the support characteristics of the various sections supporting different parts of a patient's body so that optimized support may be provided for such patient. Such relationship may be expressed in different ways in accordance with this invention, eg. a range of support characteristics for each of the respective pad sections.

Typical convoluted foam mattress overlays do not provide as favorable pressure dispersion for all parts of a patient's body to prevent decubitus ulcers as does a flat foam pad. Thus, it is another present object to provide all effective engineered pad which has an essentially flat support surface.

It is a further goal to provide particular predetermined and different support for different parts of a patient's body in order to most effectively minimize or disperse pressures applied thereto. In accordance with this invention, the general mid-section of a patient's body, the scapula, the sacrum (with the patient in a supine position), and the trochanter (with the patient in a lateral position), are all provided with support geometry which is different from that provided for the head and heels of the patient. Generally, such is achieved by providing a relatively flat foam mattress overlay having a coordinated system design for optimum support of the overall body.

It is yet another object of the present invention to provide an engineered polyurethane mattress overlay which recognizes that adjusting support for a patient's lead or foot areas affects the support and pressure dispersion provided to the torso or mid-area of the patient (the reverse affect also being true). Therefore, a further aspect of this invention is to provide an engineered polyurethane mattress overlay which has at least two or more separate support sections which function as an inter-related system (i.e., in a systematized relationship).

It is still a further object of this invention to provide a mattress overlay having interface pressures among support sections thereof (i.e. interface of such sections and a user's body) which are relatively independent of a user's body build. It is a further aspect of this invention to provide a mattress overlay which is effective in supporting all parts of a patient's body in all positions thereof.

Generally, it is recognized by this invention that at least three characteristics of pads made from foamed materials such as foamed polyurethane) contribute to the effectiveness of the resulting pad used for supporting patients. Such characteristics are:

(1) thickness of the foam pad;

(2) indentation load deflection (ILD) of the resulting pad (defined for purposes of this disclosure as the number of pounds of pressure needed to push a 50 square inch circular plate into a pad so as to deflect such pad a given percentage distance of its non-loaded thickness); and (3) density (i.e. weight per cubic foot) of the material comprising the pad.

It is a further object of this invention to provide all engineered mattress overlay which effectively mixes and selects the foregoing characteristics of foam materials (i.e. thickness, ILD, and density) to provide a pad which optimizes pressure dispersion for all parts of a patient's body, generally without regard to the nature of the prone position assumed by the patient (i.e. supine or lateral) or the body build of the patient. It is also an object to devise and provide effectiveness ratings and the like which take into account the inter-relationship of all such three characteristics.

While numerous objects and features of the present invention will be understood by one of ordinary skill in the art upon studying the present specification, various combinations of such features and elements of this invention may be collected and provided in a given construction for comprising all exemplary embodiment in accordance with this invention. For example, one such exemplary embodiment in accordance with features of this invention is directed to a mattress pad for providing systematized pressure dispersion for a person reclined thereon, comprising a main body of resilient material; an upper support surface, defined by the main body, for receipt of a person thereon; a plurality of parallel longitudinal and parallel transverse cuts formed in the main body, and defining a plurality of rectangular-shaped elements; a plurality of sections defined in the body, with each respective section including at least two adjacent transverse rows of the rectangular-shaped elements, and having predetermined support characteristics and element cross-sections which are generally constant over the respective section but which differ among the sections; wherein the support characteristics are selected with determined relationships therebetween so as to form a support system for dispersing pressure in a desired manner for all parts of a person reclined thereon.

Another exemplary embodiment in accordance with this invention concerns a multi-section mattress overlay for supporting in a systematized manner all parts of a patient received thereon, the mattress comprising a generally rectangular body of foam material defining an essentially flat support surface for receiving a patient in a substantially longitudinal, prone position thereon; at least three longitudinally-spaced sections formed in the support surface, each of the sections having at least one uniform, predetermined load-bearing characteristic which is selected with respect to that of each other section for establishing the systematized support provided by the overlay; and grid-shaped cuts formed in the support surface of the body so as to define substantially rectangular projections therein, the cross-sectional area of such projections being constant over a given section but varying with the three sections so as to determine the load-bearing characteristics thereof.

Still another apparatus constructed as an exemplary embodiment in accordance with this invention includes a pad with systematized features for supporting a person, comprising a rectangular member of resilient material laving a predetermined thickness; and a support surface formed on one side of the member, the surface defining three longitudinal areas therein generally for operative association with the head, mid-section, and feet, respectively, of a person; the head and feet areas each having 25% ILD characteristics in a range from about 17 pounds to about 22 pounds, and the mid-section area having a 25% ILD characteristic in a range from about 21 pounds to about 26 pounds; wherein 25% ILD stands for 25% indentation load deflection, which is defined by the number of pounds of pressure required to push a 50 square inch circular plate into the polyurethane member so as to compress same by 25% of its predetermined thickness.

Numerous variations of and modifications to the presently disclosed embodiments and respective features thereof will occur to one of ordinary skill in the art. All such variations, and equivalent substitutions therefor, are intended to be included within the scope and spirit of this invention by virtue of present reference thereto.

BRIEF DESCRIPTION OF THE DRAWINGS

A full and enabling disclosure of the present invention, including the best mode thereof, may be understood upon studying the following detailed specification, in conjunction with the appended figures, in which.

Figure 7:
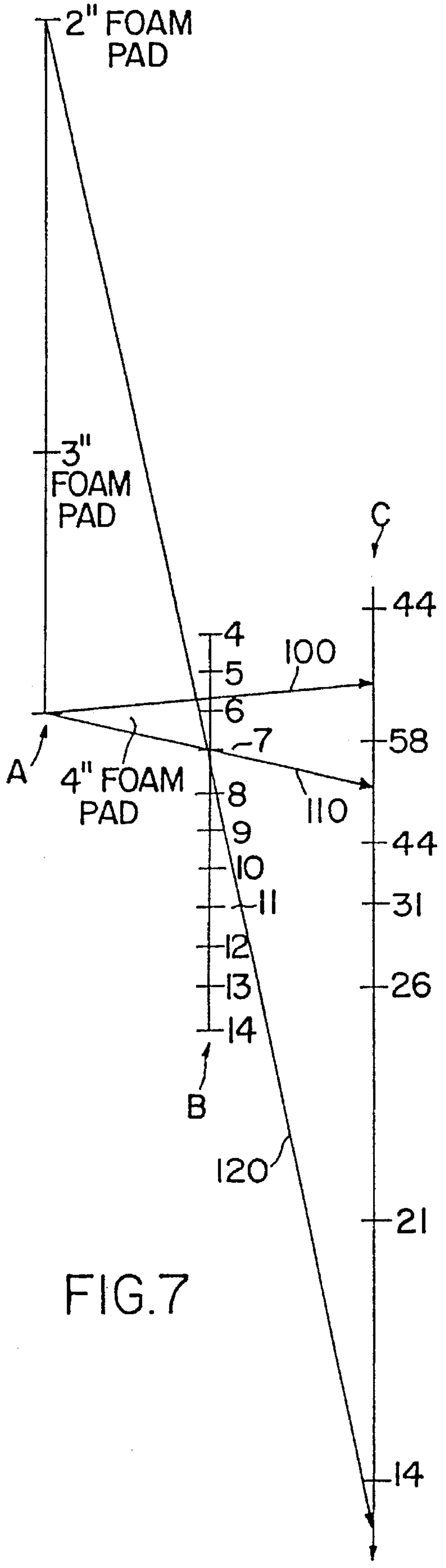
FIG. 7 is a homograph in accordance with features of this invention illustrating relative effectiveness ratings in reducing the risk of decubitus ulcers for various pad embodiments of different thickness, ILD, and density combinations.

Repeat use of the same reference characters throughout the present specification and drawings is intended to indicate same or analogous elements or features of the present invention, with the exception of the numbers on time graph lines of FIG. 7 which are not intended as reference characters. In most instances, dotted line representations are intended to illustrate alternative features of the embodiment presently shown, unless otherwise indicated.

DETAILED DESCRIPTION OF THE PREFERRED EMBODIMENT

Referring to the figures, a mattress pad 10 includes a main body 20 comprised of resilient material. A variety of resilient materials may be used, with foam polyurethane preferred. Pad 10 is generally rectangular and provided with a predetermined thickness, typically in a range of about 2 to 4 inches. The exact rectangular dimensions may also vary, but approximately 34 inches wide by about 74 inches long preferred for the exemplary embodiment presently illustrated.

Figure 3:
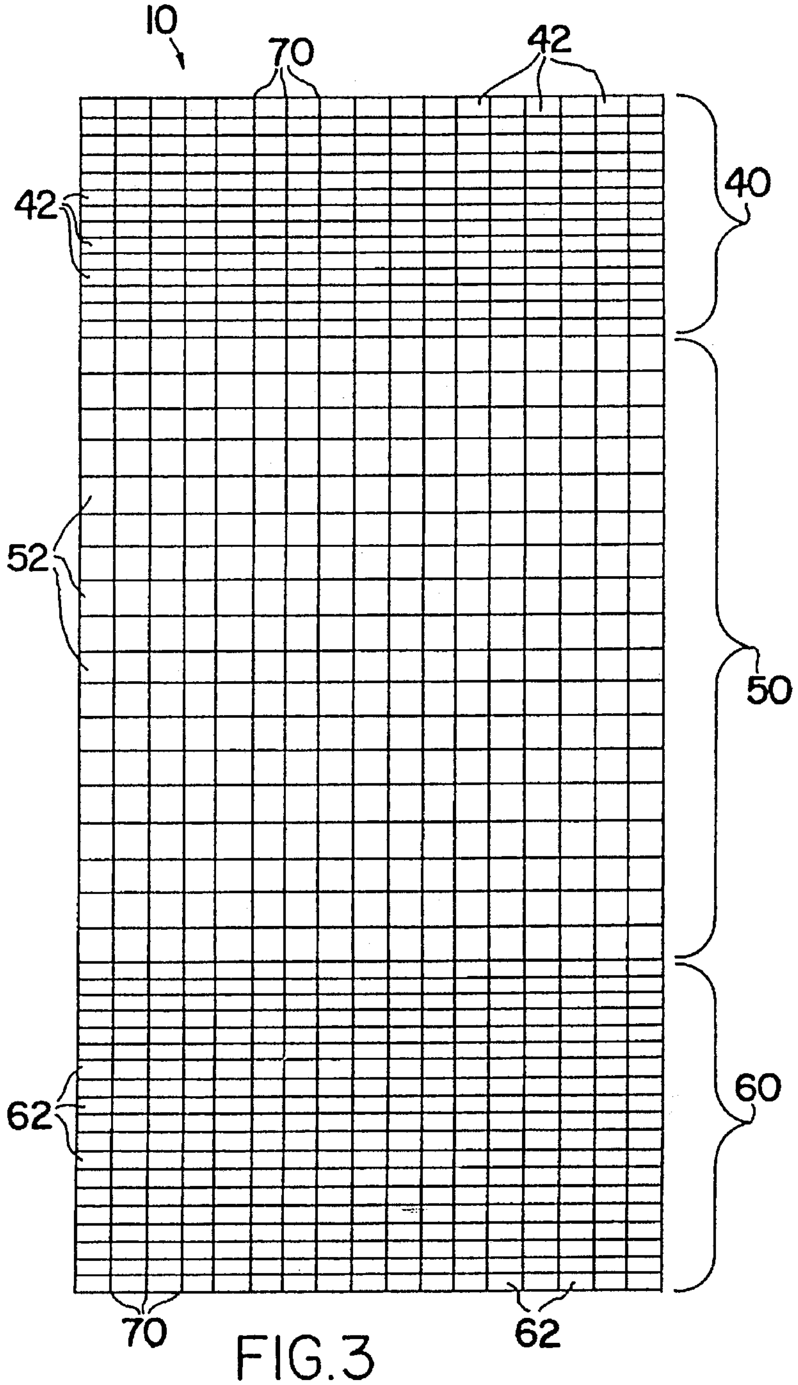
FIGS. 3 and 4 are top and side plan views, respectively, of the exemplary embodiment of FIG. 1.
Figure 4:
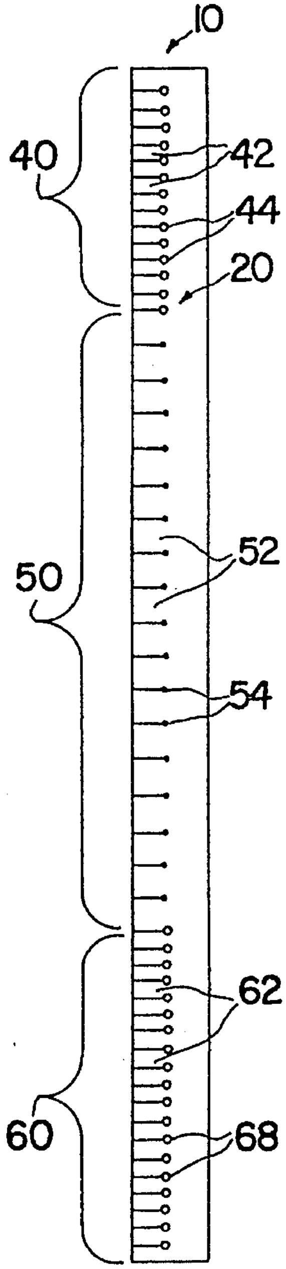

Pad 10 has a defined upper support surface 30 which is essentially flat. Surface 30 may longitudinally be divided into a plurality of sections (at least two, preferably three), each having predetermined support characteristics which are generally constant over their respective sections, but which may typically differ among such sections. FIGS. 3 and 4 generally show three such sections, 40, 50, and 60. Initially main body 20 comprises uniform resilient material. Sections 40, 50, and 60 may be formed by variously adapting upper support surface 30 to tailor the support characteristics thereof. While the respective longitudinal lengths of sections 40, 50, and 60 may vary, in one preferred embodiment section 40 is about 16 inches long, section 50 is about 36 inches long, and section 60 is about 21 inches long.

One preferred method of adapting such sections for particular support characteristics is to make a plurality of cuts through or form separations in main body 20. Such cuts (discussed in greater detail below) may be variously placed in virtually any displacement in body 20 and in a variety of relationships to surface 30, but rectangular patterns (particularly as illustrated by FIG. 3) are preferred for ease of manufacture and effectiveness in selectively altering support characteristics of main body 20. In accordance with broader aspects of this invention, whenever a main body 20 of a predetermined thickness and uniform density is initially provided, a desired indentation load deflection (ILD) may be established in sections 40, 50, and 60 by changing from one section to another the disposition and nature (eg. the spacing and number) of the plurality of parallel longitudinal and parallel transverse cuts in such main body.

Providing two sets of parallel cuts disposed so as to intersect one another at 90° angles (as in present FIG. 3) defines independent rectangular-shaped elements or projections, up-turned sides of which form support surface 30. A plurality of such projections are formed in each of the various sections, with at least two transverse rows of such projections preferred in each respective section. In one preferred embodiment, projections 42 and 62, formed respectively in sections 40 and 60, may be approximately 1 by 2 inches, and have a thickness (i.e. height) of approximately 1.5 inches (whenever a three inch main body 20 is initially provided). Projections 52 in such preferred embodiment may comprise approximately 2 inches by 2 inches, with all projections from the different sections having substantially identical heights.

As generally illustrated by the figures, projections in accordance with this invention are substantially rectangular-shaped in cross-section, both in the plane of support surface 30 and at various depths therebelow. In general, the cross-sectional area of the rectangular-shaped elements is greater beneath the plane of surface 30, than in such, plane. This is due to bevelled surfaces of such projections, discussed below in greater detail with reference to FIGS. 5 and 6.

Figure 1:
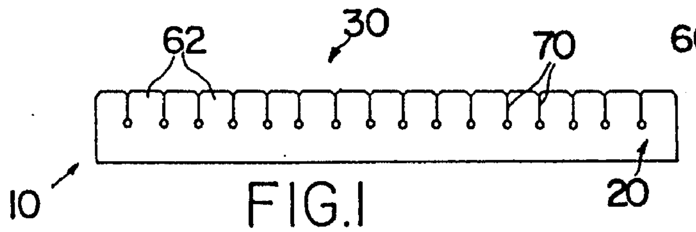
FIG. 1 illustrates an end plan view of an exemplary, mattress overlay constructed in accordance with this invention.
Figure 2:
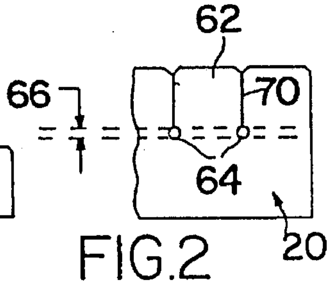
FIG. 2 is an enlarged, partial illustration of the right hand corner of FIG. 1.
Figure 5:
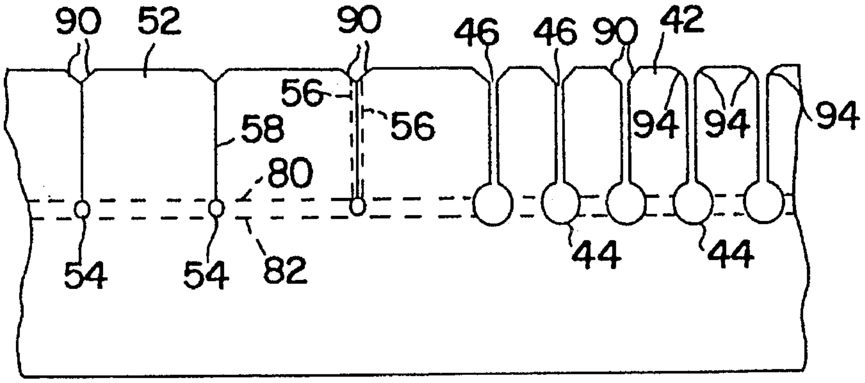
FIGS. 5 and 6 are enlarged side and perspective views, respectively, of a portion of the FIG. 4 illustration.
Figure 6:
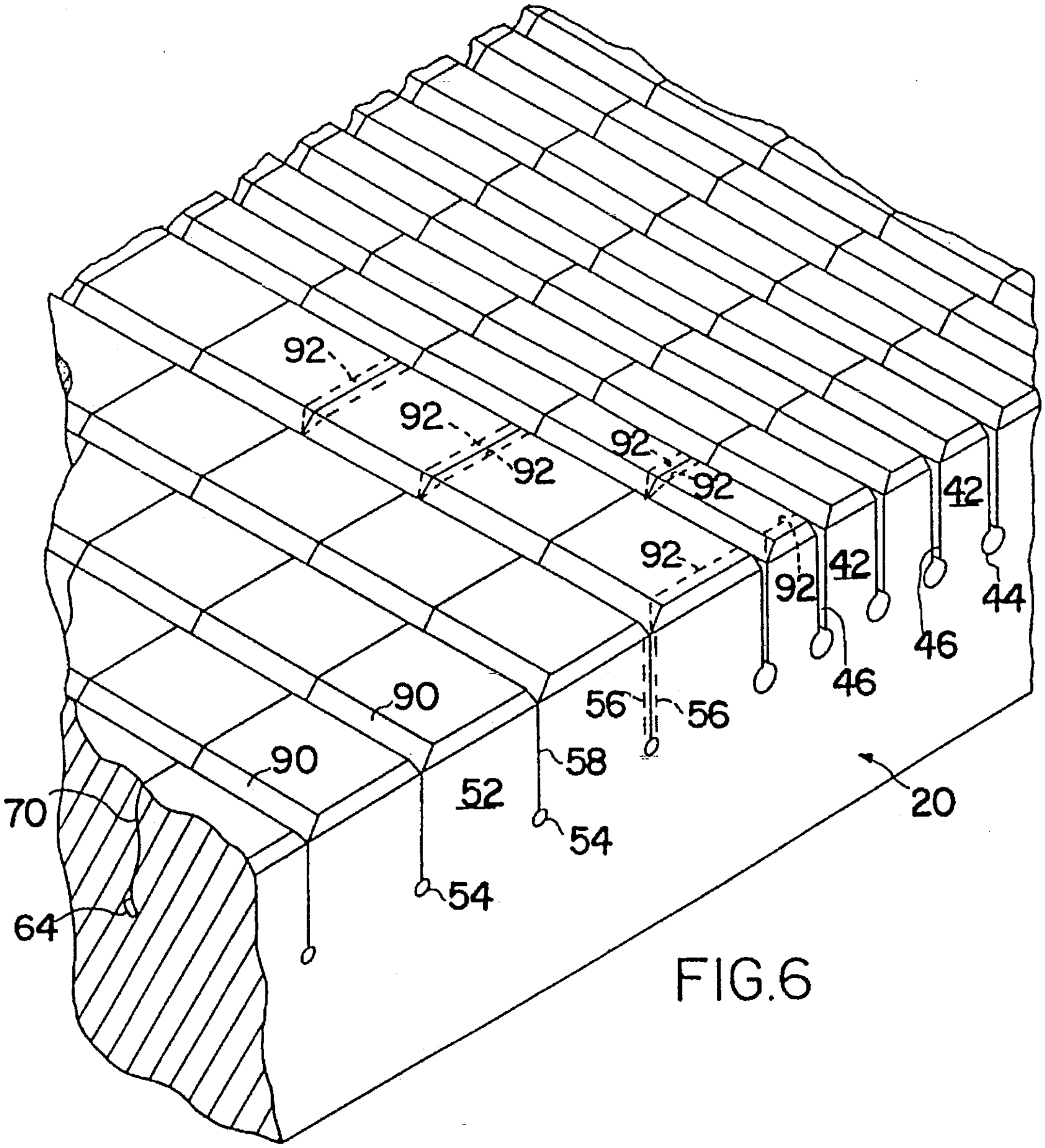

Referring in particular to FIGS. 2, 5, and 6, as a further optional feature of this invention channels may be formed in main body 20 at the base of projections 42, 52, and 62. Such channels may assume various shapes and forms, but a generally circular cross-section is preferred for combined effectiveness of their dissipation function and ease of fabrication. The channels intersect with the separations (or cuts) which define adjacent projections, and thereby receive heat and moisture from a patient or person resting pad 10 for generally dissipating excesses of same. Excess heat and moisture may also enter such channels by filtering through the body of pad 10. By either manner, dissipation removes air from around the user so as to carry off excess heat and moisture, thereby enhancing the comfort provided by the mattress pad. Further, the channels cooperate with the cuts to promote independent action of the individual projections responsive to loads placed thereon. Also, the channels may alternatively be formed at the bottom of longitudinal cuts, lateral cuts, or virtually any combination of both (including all of both as shown by the present figures). While permitting independent action, the substantially rectangular nature of the present projections preserves a desirable up/down compression action. Instead of being easily twisted or contorted during loading, the present projections move substantially straight up and down due to cooperation with the respective presence of adjacent rectangularly-shaped projections.

FIG. 2 illustrates generally circular channels 64 having generally all the same diameter 66, preferably in the range of 0.5 centimeters. Channels 64 run longitudinally along the entire length of pad 10 as do the longitudinal cuts 70 with which they are associated. In general, actual lateral separation due to cuts 70 between adjacent projections will be preferably about zero. Also, it is preferred that the lateral spacing between longitudinal cuts 70 be substantially constant over the entire lateral width of pad 10.

The longitudinal spacing of lateral cuts made pad 10 is generally constant in a given section but varies from one section 40, 50, or 60 to another. Similarly, the cross-sectional areas of projections 42, 52, and 62 are generally constant (at given depths thereof) in their respective sections, but differ from one section to the next. Furthermore, the longitudinal separation distance between adjacent projections and the diameter of circular channels associated therewith also typically varies from one section to another while being generally constant in a given section. Alternatively, the longitudinal spacing of cuts in body 20 could be held constant over the entire pad 10, and the lateral spacing varied in each respective support section thereof for adjusting their respective load-bearing characteristics.

FIG. 5 shows two dotted lines 80 and 82 for illustration purposes only which demonstrate that circular channels 44 (associated with section 40) have a generally larger constant diameter than the generally constant diameter of circular channels 54 (associated with section 50). The diameter of circular channels 54 preferably falls in a range from about 0.5 centimeters to about 0.8 centimeters, while that of channels 44 preferably fall in a higher range from about 1.0 to about 1.2 centimeters. Circular channels 68 (FIG. 4), associated with lateral cuts formed in section 60, typically have diameters of approximately the same size as those of circular channels 44.

As illustrated particularly by present FIGS. 5 and 6, lateral cuts made across the width of main body 20 preferably provide some finite longitudinal separation distance between adjacent projections, instead of generally providing virtually no separation distance as do longitudinal cuts 70. While variations may be practiced in accordance with this invention, a longitudinal separation distance of approximately 0.4 centimeters between adjacent projections 42 is preferably formed by cuts 46 made therebetween. Longitudinal separations between adjacent projections 62 are preferably but not limited to distances similar to those between adjacent projections 42.

Projections 52 generally need not be appreciably separated, but a separation distance of approximately one-half that produced with cuts 46 (i.e., 0.2 centimeters) is preferred. Dotted lines 56 in FIGS. 5 and 6 represent such 0.2 centimeter preferred separation distance, while solid lines 58 illustrate an alternative embodiment of separation representing virtually no (i.e. zero) separation distance.

All of the foregoing variations in slot spacing, projection separation distances, and channel diameters, contribute to the inter-related systematized adaptation of sections 40, 50, and 60 for dispersing pressure from a user reclining on pad 10.

While the present invention generally utilizes a relatively flat support surface 30 instead of a convoluted support surface, each of projections 42, 52, and 62 may be further provided with bevelled edges which enhance independent action thereof. For example, bevelled edges 90 (FIGS. 5 and 6) may be selectively used on any or all of the projection edges laterally formed on upper support surface 30. Likewise, bevelled edges 92 (shown in dotted line in FIG. 6) may be provided in association with the longitudinal outs defined in upper support surface 30 for providing further independent action between adjacent projections. Lateral bevelled edges 90 and longitudinal bevelled edges 92 may be optionally used with any or all of projections 42, 52, and 62.

Furthermore, any of either type of bevelled edges (90 or 92) may be generally straight-lined, as illustrated, or alternatively provided generally with a radius of curvature such as illustrated by such sides 94 of FIG. 5. More rounded sides 94 further enhance independent movement of associated projections without adversely affecting other beneficial features and aspects of this invention.

While the foregoing describes in detail various structural aspects of the present invention which may be observed from a visual inspection thereof, further features of this invention concern support characteristics of pad 10 not immediately discernible.

Support characteristics defined by sections 40, 50, and 60 of upper support surface 30 may be varied so as to define a system of patient support for optimized pressure dispersion. Adjusting the support provided any one of sections 40, 50, and 60 affects the patient support and dispersion of pressure in each of the other sections. Such is particularly the case whenever a subject patient is supported in a prone position (either supine or lateral) over all three-support sections of upper support surface 30.

It is thus one further aspect of this invention that the support provided by each section should be selected so as to define an interface relationship along all three sections, which results in a system of support for a patient, and hence optimized pressure dispersion. The three separate sections 40, 50, and 60, with their particularly selected support characteristics, collectively function as a system to achieve such optimized dispersion of pressure for all parts of a user's body in generally all positions thereof.

Assuming that section 40 is disposed adjacent a patient's lead, section 50 would generally support the scapula, torso, sacrum, and trochanter sections of an adult user of pad 10, while section 60 would support the lower legs, feet, and heels of such patient. In such configuration, a range of support characteristics may be stated wherein such optimized pressure dispersion may be provided. Alternatively, the orientation of a user on pad 10 may be changed so that section 40 is associated with the user's feet and Section 60 associated with the lead, while section 50 of course continues to be associated generally with the user's mid-section.

All indentation load deflection (ILD) characteristic may be defined as the number of pounds of pressure needed to push a 50 square inch circular plate into a pad a given percentage deflection thereof. For example, a 25% ILD of 30 pounds would mean that 30 pounds of pressure is required to push a 50 square inch circular plate into a four inch pad a distance of 1 inch (i.e. 25% of the original, unloaded thickness). Using a main body 20 of given thickness and density (which is assumed initially constant over such body), controlled and described variations in the ILD characteristics of selectively defined sections may be achieved by forming cuts in such sections 40, 50, and 60. In general, for a given cut size and depth, selection in the spacing of such cuts permits selection of the ILD characteristic in a given section.

Generally, it is preferred that an ILD characteristic in the range of 17 to 22 pounds be provided in each of sections 40 and 60 (at 25% compression), while section 50 is preferably provided with a 25% ILD in the range of 21 to 26 pounds. Sections 40 and 60 are not limited to having the same ILD characteristics even though they generally preferably share the same range of such. Such ILD characteristics are preferably formed in a main body member 20 initially having an uncut, uniform (i.e. constant) ILD characteristic of 30 pounds for 25% ILD. Of course, a variety of initial characteristics and modifying cuts may be practiced to achieve the above-stated ranges or their equivalents.

By providing pads with a systematized support profile of ILD's in the preferred ranges stated above, average pressure readings at various points on a person's body such as heels, scapula, sacrum, trochanter) can be reduced by as much as 25 to almost 50% from average pressure readings for the same points taken for convoluted foam overlays. In fact, convoluted pads in general have reduced ILD support characteristics in comparison with support pads having relatively flat support surfaces, and may have effectiveness as much as 50% less than such flat support surfaces. In general, whenever a relatively flat, sectioned support surface in accordance with the present invention is provided with a relationship of support characteristics for its sections, the engineered support for all parts of the user's body (and in virtually all positions thereof) surpasses support by convoluted foam overlays, as well as jell and water overlays, or even air-filled overlays presently available.

While various features of this invention have been described with reference to ILD characteristics alone, further definition of an optimal set of foam properties may be obtained from considering ILD and density support characteristics together in a multi-variable approach. A range of optimized performance can be obtained whenever all three basic characteristics of the foam material utilized (i.e., thickness, density, and ILD) are collectively adjusted and inter-related. Using a calculation of the square root of the product of ILD times density (where ILD is given in pounds and density is given in pounds per cubic foot), an optimized range for best performance numerically falls in a range of about 5.7 to about 6.9 for approximately a 4 inch thickness of foam, and in the range of about 7.5 to 9.3 for approximately a 2 inch thickness of foam.

Of course, it is possible to calculate such arbitrary numerical numbers with alternative expressions than those presently stated. For example, instead of calculating the square-root of the product of the given ILD and density for a particular embodiment (as done above), the product of the ILD and the square root of the density may be a preferable calculation in a given circumstance. In general, either expression accurately predicts the combined influence of the two variables (ILD and density) upon the effectiveness of particular embodiments.

Further, in accordance with features presently disclosed, all three variables of thickness, ILD and density may be judged on an effectiveness scale hereinafter arbitrarily referred to as the Span Index. FIG. 7 illustrates a homograph which represents the complex relationship among such three characteristics and an effectiveness rating (Span Index number).

In brief summary, the Span index predicts the performance (i.e. effectiveness) of a particular substantially flat polyurethane foam mattress of given thickness, ILD, and density characteristics for reducing the risk of decubitus ulcers for relatively immobile patients using such mattress.

In general, the higher the Span index rating, the more effective the given mattress will likely be in reducing the incidence of such ulcers.

Referring to FIG. 7, three vertical columns are established with a given, specifically determined relationship therebetween. Each column has discrete markings, but expresses continuously variable information between such discrete markings. In general, columns A and B are linear, while column C is non-linear generally as marked thereon. Column A is generally the thickness of a particular pad embodiment, expressed in inches. Column B is the square root of the product of a given ILD and density for a particular pad embodiment.

Column C is the Span Index, which is a compilation of ratings for various combinations of the aforementioned characteristics in reducing the risk of decubitus ulcers. To determine the Span index for a given combination of characteristics, the particular appropriate numbers are located in Columns A and B and joined by a straight line. Where the continuation of such line intersects Column C determines the Span index for that given embodiment.

For example, lines 100 and 110 demonstrate the resulting Span index for the two extremes stated above with respect to the preferred range for the combined ILD and density characteristics for a pad of approximately 4 inch thickness. In other words, line 100 connects a 4 inch indication on Column A and a 5.7 indication on Column B for a resulting Span index of about 50 (a relatively high rating). Similarly, line 110 is directed to the same thickness but a Column B characteristic of about 6.9, again resulting in a Span index of about 50. It should be apparent from FIG. 7 that other 4 inch embodiments falling within the stated preferred range of 5.7 to 6.9 will have an even higher span index.

Line 120, on the other hand, demonstrates the foregoing general statement that generally lower Span index numbers lave relatively reduced effectiveness. Line 120 connects a Column A two inch indication with a Column B combined ILD/density characteristic of 7.5 (one extreme of the preferred range stated above). The resulting Span index number falls below 14 (a relatively low number). As is evident from the FIG. 7 homograph, in general a two inch thick pad with a given combined ILD/density characteristic of 7.5 can be improved with respect to preventing the risk of decubitus ulcers by increasing its thickness.

In general, development and disclosure of the Span Index permits direct comparison of the effectiveness of different mattresses in reducing the risk of decubitus ulcers. The Span Index provides an absolute number which obtains meaning when compared with other absolute rating numbers, in a manner analogous to APR (annualized percentage rates) ratings for loan interest rates.

While the FIG. 7 homograph is particularly established for support pads having generally flat support surfaces, both the general Span Index concept and the specific FIG. 7 homograph may be adapted for different basic types of pads. For example, convoluted pads may be judged directly on the graph of FIG. 7 simply by dividing the appropriate ILD and density data product by one half before taking its square root. The resulting calculation is then used in conjunction with Column B as in previous examples. The appropriate pad thickness is entered on Column A, and intersection in Column C of the resulting straight line running from Columns A and B predicts the effectiveness of that particular generally convoluted pad.

While particular embodiments and exemplary constructions have been discussed in detail above, numerous modifications and variations to this invention will occur to one of ordinary skill in the art. All such variations (for example, including substitution various materials, use of characteristics within and without stated ranges, and other alternatives, substitutions, and equivalents) come within the spirit and scope of the present invention. Further, language used above directed to the exemplary embodiments is descriptive and exemplary only, and not language of limitation, which appears only in the appended claims.

What is claimed is:

1. A process for manufacturing a pad comprising a mattress overlay with systematized features for supporting a person, comprising:

providing a generally rectangular member of resilient material having a substantially predetermined initially uniform thickness, predetermined uniform density, and predetermined initial uncut 25 percent ILD; and forming a support surface on one side of said member, said surface defining three longitudinal areas therein generally for operative association with the head, mid-section, and feet, respectively, of a person;

forming said head and feet areas so that each have area average 25 percent ILD characteristics with a range having a high end maximum of about 22 pounds, and forming said mid-section area so that it has an area average 25 percent ILD characteristic with a range having a high end maximum of about 26 pounds;

wherein 25 percent ILD stands for 25 percent indentation load deflection, which is defined by the number of pounds of pressure required to push a 50 square inch circular plate into said rectangular member so as to compress same by 25 percent of its predetermined thickness; and wherein said process further includes selecting said predetermined thickness to fall generally within a range having a low end minimum of about 3.125 inches, and selecting said predetermined uniform density and said material predetermined initial uncut 25 percent ILD such that the square root of the product of said material predetermined initial uncut 25 percent ILD and said predetermined uniform density falls generally within a range having a low end minimum of about 4.0, whenever ILD is expressed in pounds, and density is expressed in pounds per cubic foot, whereby a desired effectiveness rating for said pad is obtained for optimizing the prevention of decubitus ulcers.

2. A process as in claim 1, wherein said area average ILD characteristic ranges formed in said head and feet areas respectively each have a low end minimum of about 17 pounds, said area average ILD characteristic range formed in said mid-section area has a low end minimum of about 21 pounds, said predetermined thickness range has a high end maximum of about 4.0 inches, and said product square root range has a high end maximum of about 8.35, so as to result in a desired relatively higher Span Index effectiveness rating for said pad.

3. A process as in claim 1, wherein said predetermined uniform density is generally at least about 1.0 pound per cubic foot and said material predetermined initial uncut 25 percent ILD is generally in a range of from about 16 pounds to about 42 pounds, so as to result in a desired relatively higher Span Index effectiveness rating for said paid.

4. A process as in claim 1, wherein said forming step includes making a plurality of generally parallel cuts in generally the transverse direction in said support surface head and feet areas.

5. A process as in claim 4, further including extending said transverse cuts in said head and feet areas the entire width of said support surface so as to define a plurality of generally rectangular-shaped elements.

6. A process as in claim 5, further including making a plurality of generally parallel cuts in generally the longitudinal direction of said support surface head and feet areas, which said longitudinal cuts intersect with said transverse cuts so as to define a plurality of generally cube-shaped elements.

7. A process as in claim 5, further including making a plurality of generally parallel cuts in generally the transverse direction in said support surface mid-section area.

8. A process as in claim 7, further including extending said transverse cuts in said mid-section area the entire width of said support surface so as to define a plurality of generally rectangular-shaped elements in said mid-section area.

9. A process as in claim 8, further including making a plurality of generally parallel cuts in generally the longitudinal direction of said support surface mid-section area, which said mid-section area longitudinal cuts intersect with said mid-section area transverse cuts so as to define a plurality of generally cube-shaped elements in said mid-section area.

10. A process as in claim 5, wherein said cuts extend into said support surface a predetermined depth generally in a range of from about one inch to about three inches.

11. A process as in claim 10, wherein said predetermined depth is generally constant over said support surface cuts.

12. A process as in claim 10, wherein said cuts include a plurality of channels respectively formed at the bottom of said cuts, said channels providing means for dissipating heat and moisture from a person received on said support surface.

13. A process as in claim 12, wherein:

said channels are formed with generally circular cross-sections, having respective diameters approximately in a range of from about 0.4 centimeters to about 1.5 centimeters;

said transverse cuts are defined in said head and feet areas so as to provide longitudinal separation distances between adjacent rectangular-shaped elements approximately in a range of from about 0.1 centimeters to about 1.0 centimeters; and wherein said resilient material has a predetermined uniform density thereof such that the initial, uncut 25% ILD characteristic thereof is generally at least about 30 pounds.

14. A process as in claim 13, further including making a plurality of generally parallel cuts in generally the transverse direction in said support surface mid-section area.

15. A process as in claim 14, wherein said mid-section area transverse cuts are defined so as to provide no appreciable lateral separation distances between adjacent elements defined by said mid-section area transverse cuts.

16. A process as in claim 15, wherein said rectangular-shaped elements defined in said head and feet areas each have at least two bevelled sides intersecting with said support surface.

17. A process as in claim 16, wherein said bevelled sides each have a predetermined radius of curvature.

18. A process for manufacturing a pad comprising a mattress overlay with systematized features for supporting a person, comprising:

providing a generally rectangular member of resilient material having a substantially predetermined initially uniform thickness, predetermined uniform density, and predetermined initial uncut 25 percent ILD; and forming a support surface on one side of said member, said surface defining three longitudinal areas therein generally for operative association with the head, mid-section, and feet, respectively, of a person;

forming said head and feet areas so that each have area average 25 percent ILD characteristics in a range generally from about 50 percent to about 90 percent of that of said material predetermined initial uncut 25 percent ILD and forming said mid-section area so that it has an area average 25 percent ILD characteristic in a range generally from about 60 percent to about 100 percent of that of said material predetermined initial uncut 25 percent ILD;

wherein 25 percent ILD stands for 25 percent indentation load deflection, which is defined by the number of pounds of pressure required to push a 50 square inch circular plate into said rectangular member so as to compress same by 25 percent of its predetermined thickness; and wherein said process further includes selecting said predetermined thickness to fall generally within a range of from about two inches to about four inches, selecting said material predetermined initial uncut 25 percent ILD so as to fall generally in a range of from about 24 pounds to about 35 pounds, and selecting said predetermined uniform density such that the square root of the product of said material predetermined initial uncut 25 percent ILD and said predetermined uniform density is generally at least about 4.0, whenever ILD is expressed in pounds, and density is expressed in pounds per cubic foot, whereby a desired effectiveness rating for said pad is obtained for optimizing the prevention of decubitus ulcers.

19. A process as in claim 18, wherein said support surface is generally flat.

20. A process as in claim 18, wherein said density is generally at least about 1.0 pound per cubic foot, said material predetermined initial uncut 25 percent ILD is generally at least about 30 pounds, said area average ILD characteristic ranges formed in said head and feet areas respectively each generally range from about 55 percent to about 75 percent of that of said material predetermined initial uncut 25 percent ILD, and said area average ILD characteristic range formed in said mid-section area generally ranges from about 70 percent to about 90 percent of that of said material predetermined initial uncut 25 percent ILD.

21. A process as in claim 18, wherein said predetermined uniform density is generally at least about 1.0 pounds per cubic foot and said product square root is generally not greater than about 8.35, so as to result in a desired relatively higher Span Index effectiveness rating for said pad.

22. A process as in claim 18, wherein said forming step includes making a plurality of generally parallel cuts in generally the transverse direction in said support surface head and feet areas.

23. A process as in claim 22, further including extending said transverse cuts in said head and feet areas the entire width of said support surface so as to define a plurality of generally rectangular-shaped elements.

24. A process as in claim 23, further including making a plurality of generally parallel cuts in generally the longitudinal direction of said support surface head and feet areas, which said longitudinal cuts intersect with said transverse cuts so as to define a plurality of generally cube-shaped elements.

25. A process as in claim 23, further including making a plurality of generally parallel cuts in generally the transverse direction in said support surface mid-section area.

26. A process as in claim 25, further including extending said transverse cuts in said mid-section area the entire width of said support surface so as to define a plurality of generally rectangular-shaped elements in said mid-section area, and further including making a plurality of generally parallel cuts in generally the longitudinal direction of said support surface mid-section area, which said mid-section area longitudinal cuts intersect with said mid-section area transverse cuts so as to define a plurality of generally cube-shaped elements in said mid-section area.

27. A process as in claim 23, wherein said cuts extend into said support surface a predetermined depth generally in a range of from about one inch to about three inches.

28. A process as in claim 27, wherein said predetermined depth is generally constant over said support surface cuts.

29. A process as in claim 27, wherein said cuts include a plurality of channels respectively formed at the bottom of said cuts, said channels providing means for dissipating heat and moisture from a person received on said support surface.

30. A process as in claim 29, wherein:

said channels are formed with generally circular cross-sections, having respective diameters approximately in a range of about 0.4 centimeters to about 1.5 centimeters;

said transverse cuts are defined in said head and feet areas so as to provide longitudinal separation distances between adjacent rectangular-shaped elements approximately in a range of from about 0.1 centimeters to about 1.0 centimeters; and wherein said resilient material has a predetermined uniform density thereof such that the initial, uncut 25% ILD characteristic thereof is generally at least about 30 pounds; and said process further including making a plurality of generally parallel cuts in generally the transverse direction in said support surface mid-section area.

* * * * *